Patented Oct. 12, 1926.

1,603,136

UNITED STATES PATENT OFFICE.

ALBERT MESSMER, OF RAPPERSWIL, SWITZERLAND, ASSIGNOR TO MARTIN FLU-BACHER-BRODBECK, OF MULLHEIM, SWITZERLAND.

METHOD OF PRESERVING FODDER.

No Drawing. Application filed December 16, 1924, Serial No. 756,359, and in Switzerland February 4, 1924.

In a method used hitherto for rendering green fodder durable in containers it was necessary to cause the fodder to wither and to pack it loosely, in order to stimulate breathing of the plants, i. e. to produce the desired fermentation and the requisite self-heating up to 60°. By this heating above 32° favourable conditions were created for the vitality and propagation of the spore-forming butyric acid bacteria, so that they multiplied very considerably. This was a disadvantage, as cows fed with such preserved fodder give milk, which produces cheese having a tendency to become friable. A further disadvantage of self-heating above 32° was the breaking down of albumen in the fodder and the consequent partial depreciation of the fodder. In addition to this the practical application of the process involving self-heating demanded thoroughness and accuracy, without which failure was easily the result. In the old method there was the further disadvantage that vegetable juices accumulated in certain parts of the stock of fodder, thus forming breeding places for butyric acid bacteria, which made it difficult to render the whole stock uniformly durable. Any considerable movement of the juices in the container entailed a considerable loss in nutritive properties.

By the method forming the subject of the present invention for the production of durable green fodder from fodder plants, without withering, without loose layering and with a reduction of self-heating of the fodder, all the disadvantages referred to are overcome and it becomes possible to render the fodder durable in a simple and certain manner without expert knowledge. The successful application of this method is far less dependent on the weather than was the case with the old method. The amount of work in the meadow is considerably reduced, the fodder being brought in green, as when cut, and the turning and spreading of the fodder is done away with. The fodder suffers no injurious organic change or loss of juices through the present method and therefore remains substantially in its original state. Consequently there are no losses of nutritive properties and above all there is no breaking down of albumen.

The new method consists in placing freshly cut fodder plants in layers free from dew and rain in an air tight container, as a rule pressing it continuously the while, for instance by treading or stamping, thereupon subjecting each layer to heavy pressure, thereby preventing any breathing of the plants and any injurious fermentation, and injurious self-heating of the fodder and sprinkling the fodder to be preserved before or while filling it into the container uniformly with a solution of a mixture containing sodium chloride, calcium chloride, sodium phosphate and ferrous lactate. A suitable proportion for these ingredients is sodium chloride 50%, calcium chloride 10%, sodium phosphate 10% and ferrous lactate 30%.

The spraying of a solution of this mixture onto freshly cut fodder in the manner explained has been found effectively to prevent the propagation or germination of the ferment of butyric acid fermentation.

The new method may be carried out for instance as follows:

Cut fodder grass, for instance clover, a mixture of vetches or maize is placed directly after it is cut and while as free as possible from damage by dew or rain in an air-tight container, in which it is trodden down or stamped down with a stamp. While being charged into the container the green fodder is uniformly sprayed with a solution containing common salt, calcium chloride and sodium phosphate. The solution contains preferably 3% of the salt mixture. This spraying should reach if possible every part of the plants. After the treading or stamping operation this layer is immediately subjected by means of a pressing device, for instance a weighted cover, to strong pressure, which does not allow the self-heating of the fodder to rise above 28–32° C., i. e. not to the temperature favourable to the vitality and multiplication of the spore-forming butyric acid ferment, and which drives the air out of the said layer. Breathing and fermentation of the fodder are thereby stopped and excessive heating is impossible. After the pressure has been allowed to act for some time, the cover producing the pressure is removed and a second layer of freshly cut fodder that has not been exposed to the action of dew or rain is thrown in, trodden or stamped down while being sprayed with the salt solution referred to and pressed to such an extent that the self-heating in the fodder does not rise above 32°, i. e. remains below the temperature favourable to the propagation of the butyric acid bacteria, and the air expelled from the second layer. This is repeated until the container is full. The mass of fodder in the container always remains under the selected pressure. There is no heating of the upper layers by the lower ones or only to a very slight degree, which is not injurious. The salts referred to keep the fodder quite cold or completely paralyze the breathing of the cells and the fermentation by causing the cells of the plants to shrink and thereby reducing the breathing capacity of the plants. This is, however, only necessary where the milk obtained from the fodder is to be made into Emmenthaler cheese. If cheese is not to be made, it is not absolutely necessary to subject each layer of fodder to heavy pressure and to tread and stamp the fodder. In this process the fodder suffers no loss of nutritive value and the process is very simple and does not require expert knowledge or the careful and constant measurement of temperature. At the low temperature at which the self-heating and fermentation are kept in this process there is no breaking down of albumen.

The spraying with the salt solution may also be effected before the green fodder is filled into the container, for example, immediately after the fodder plants are cut or also before the plants are cut. The fodder may be filled into the container in layers day by day.

If Emmenthaler cheese is to be made, it is of the greatest importance that the air should be driven out of the mass of fodder as completely as possible and that the breathing of the plants should be paralyzed.

As a result of comparative tests of green fodder filled into the container without the admixture of salt and of fodder treated by the present process,—

Samples of grass filled in without any additions were found to contain the following amounts of acids which volatilize with water vapour:—

After 1 month, 6.2 grams per kg.; after 2 months, 9.5 grams per kg.; after 3 months, 11.3 grams per kg. When examined under the microscope: after 1 month numerous butyric acid forming organisms and spores were found. As the examination proceeds the organisms and spores are found to increase continuously, enormous quantities of spores being recognizable after 3 months. The smell of butyric acid is very strong and increases continuously.

Parallel tests carried on at the same time with fresh grass, which had been sprayed with the salt solution referred to, gave the following results:—

The picture shown by the microscope differed very much from the above, only a few spores being present at the start (also only few bacteria), while no increase could be observed during the period the sample was under observation. The relative figures always remained practically the same.

The smell was always aromatically mild and sweet and no smell of butyric acid could be observed.

What I claim is:—

1. A method of producing preserved green fodder from fodder plants of all kinds, consisting in placing freshly cut fodder plants, which have not been acted on by dew or rain, in an air-tight container, and uniformly spraying the fodder to be preserved with a solution of a mixture containing sodium chloride, calcium chloride, sodium phosphate and ferrous lactate for preventing the ferment of the butyric fermentation propagating or forming spores.

2. A method of producing preserved green fodder from fodder plants of all kinds, consisting in placing freshly cut fodder plants, which have not been acted on by dew or rain, in layers in an air-tight container, continuously pressing them down while they are being placed in the container thereupon subjecting each layer immediately to heavy pressure, whereby any breathing of the plants, any injurious fermentation and injurious self-heating of the fodder is prevented, and uniformly spraying the fodder to be preserved with a solution of a mixture containing sodium chloride, calcium chloride, sodium phosphate and ferrous lactate for preventing the ferment of the butyric fermentation propagating or forming spores.

3. A method of producing preserved green fodder from fodder plants of all kinds, consisting in placing freshly cut fodder plants, which have not been acted on by dew or rain, in layers in an air-tight container, continuously pressing them down while they are being placed in the container thereupon subjecting each layer immediately to heavy pressure, whereby any breathing of the plants, any injurious fermentation and injurious self-heating of the fodder is prevented, and uniformly spraying the fodder to be preserved while being placed in the container with a solution of a mixture containing sodium chloride, calcium chloride, sodium phosphate and ferrous lactate for preventing the ferment of the butyric fermentation propagating or forming spores.

4. A method of producing preserved green fodder from fodder plants of all kinds, consisting in placing freshly cut fodder plants, which have not been acted on by dew or rain, in layers in an air-tight container, continuously pressing them down while they are being placed in the container thereupon subjecting each layer immediately to heavy pressure, whereby any breathing of the plants, any injurious fermentation and self-heating of the fodder above 28–32° C. is prevented, and uniformly spraying the fodder to be preserved with a solution of a mixture containing sodium chloride, calcium chloride, sodium phosphate and ferrous lactate for preventing the ferment of the butyric fermentation propagating or forming spores.

In testimony whereof I have affixed my signature.

ALBERT MESSMER.